(12) United States Patent
Beser

(10) Patent No.: US 6,331,987 B1
(45) Date of Patent: Dec. 18, 2001

(54) METHOD AND SYSTEM FOR BUNDLING DATA IN A DATA-OVER-CABLE SYSTEM

(75) Inventor: Nurettin B. Beser, Evanston, IL (US)

(73) Assignee: 3COM Corporation, Santa Clara, CA (US)

( * ) Notice: Subject to any disclaimer, the term of this patent is extended or adjusted under 35 U.S.C. 154(b) by 0 days.

(21) Appl. No.: 09/085,586

(22) Filed: May 27, 1998

(51) Int. Cl.$^7$ .................................................. H04H 1/04
(52) U.S. Cl. .................................. 370/486; 725/105
(58) Field of Search ........................... 370/351, 352, 370/395, 431, 468, 486, 487; 375/222; 455/3.1, 3.2, 5.1; 348/6, 8, 12; 725/63, 64, 74, 86, 91, 105, 143, 144, 111

(56) References Cited

U.S. PATENT DOCUMENTS

| | | | |
|---|---|---|---|
| 4,644,533 | 2/1987 | Braff et al. ........................ | 370/94 |
| 4,881,263 | 11/1989 | Herbison et al. ................. | 380/21 |
| 5,014,234 | 5/1991 | Edwards, Jr. ..................... | 364/900 |
| 5,138,712 | 8/1992 | Corbin ............................... | 395/700 |
| 5,347,304 | 9/1994 | Moura et al. . | |
| 5,442,749 | 8/1995 | Northcutt et al. ............... | 395/200.09 |
| 5,488,412 | 1/1996 | Majeti et al. . | |
| 5,489,897 | 2/1996 | Inoue .............................. | 340/870.39 |
| 5,583,931 | 12/1996 | Schneider et al. . | |
| 5,586,121 | 12/1996 | Moura et al. . | |
| 5,598,410 | 1/1997 | Stone ................................ | 370/469 |
| 5,600,717 | 2/1997 | Schneider et al. . | |
| 5,606,606 | 2/1997 | Schneider et al. . | |
| 5,608,446 | 3/1997 | Carr et al. . | |
| 5,610,910 | * 3/1997 | Focsaneanu et al. ........... | 370/351 |
| 5,623,542 | 4/1997 | Schneider et al. . | |
| 5,623,601 | 4/1997 | Vu .................................... | 395/187.01 |
| 5,636,211 | 6/1997 | Newlin et al. . | |
| 5,675,732 | 10/1997 | Majeti et al. . | |
| 5,710,885 | 1/1998 | Bondi ................................ | 709/224 |
| 5,761,602 | 6/1998 | Wagner et al. .................... | 455/3.1 |
| 5,778,181 | 7/1998 | Hidary et al. ................... | 395/200.48 |
| 5,790,198 | 8/1998 | Roop et al. ....................... | 348/460 |
| 5,790,548 | 8/1998 | Sistanizadah et al. .......... | 370/401 |
| 5,790,677 | 8/1998 | Fox et al. .......................... | 380/24 |
| 5,790,806 | 8/1998 | Koperda .......................... | 395/200.82 |
| 5,799,086 | 8/1998 | Sudia .................................. | 380/23 |
| 5,805,804 | 9/1998 | Laursen et al. .................. | 348/7 |
| 5,809,252 | 9/1998 | Beighe et al. ................... | 395/200.57 |
| 5,812,819 | 9/1998 | Rodwin et al. ................. | 395/500 |
| 5,818,845 | 10/1998 | Moura et al. .................... | 370/449 |
| 5,819,028 | 10/1998 | Manghirmalani et al. ...... | 395/185.1 |
| 5,819,042 | 10/1998 | Hansen ............................. | 714/756 |
| 5,828,655 | 10/1998 | Moura et al. .................... | 370/326 |

(List continued on next page.)

OTHER PUBLICATIONS

"Cable Modem to Customer Premise Equipment Interface Specification (Interim) SP–CMCI–I02–980317", Multimedia Cable Network System (MCNS) Holdings, L.P., 1998, pgs. ii to 40.

(List continued on next page.)

*Primary Examiner*—Ajit Patel
(74) *Attorney, Agent, or Firm*—McDonnell Boehnen Hulbert & Berghoff

(57) ABSTRACT

A method and system for specifying channels for data sent upstream in a data-over-cable system, including data leaving the data-over-cable system is provided. The data sent upstream from an application has a corresponding group-identification parameter, also referred to as a flow-identification parameter. This parameter specifies a particular channel on which the data is to be forwarded. This specification is based on a correspondence between the data-identification parameter and a channel-identification parameter assigned to the channels over which data-packets are transmitted. The data-over-cable system may use the data-identification parameter to allocate access to a channel as part of a Quality-of-Service request. This parameter also allows sorting of data-packets for further transmission upstream, including possible bundling to form groups of data-packets and subsequent transmission upstream.

21 Claims, 9 Drawing Sheets

U.S. PATENT DOCUMENTS

| | | | |
|---|---|---|---|
| 5,828,666 | * 10/1998 | Focsaneanu et al. | 370/389 |
| 5,835,720 | 11/1998 | Nelson et al. | 395/200.54 |
| 5,835,727 | 11/1998 | Wong et al. | 395/200.68 |
| 5,841,777 | 11/1998 | Cohen | 370/433 |
| 5,852,721 | 12/1998 | Dillon et al. | 395/200.47 |
| 5,854,901 | 12/1998 | Cole et al. | 709/245 |
| 5,859,852 | 1/1999 | Moura et al. | 370/449 |
| 5,864,679 | 1/1999 | Kanai et al. | 709/238 |
| 5,870,134 | 2/1999 | Laubach et al. | 348/12 |
| 5,872,523 | 2/1999 | Dellaverson et al. | 340/825.52 |
| 5,884,024 | 3/1999 | Lim et al. | 395/187.01 |
| 5,903,558 | 5/1999 | Jones et al. | 370/351 |
| 5,913,037 | 6/1999 | Spofford et al. | 395/200.56 |
| 5,922,049 | 7/1998 | Radia et al. | 709/220 |
| 5,922,051 | 7/1999 | Sidey | 709/223 |
| 5,923,659 | 7/1999 | Curry et al. | 370/401 |
| 5,943,604 | 8/1999 | Chen et al. | 455/5.1 |
| 5,954,797 | 9/1999 | Sidey | 709/223 |
| 5,958,007 | 9/1999 | Lee et al. | 709/219 |
| 5,974,453 | 10/1999 | Anderson et al. | 709/220 |
| 5,991,292 | * 9/1999 | Focsaneanu et al. | 370/352 |
| 5,996,076 | 11/1999 | Rowney et al. | 713/201 |
| 6,003,077 | 12/1999 | Bawden et al. | 709/223 |
| 6,005,851 | 12/1999 | Craddock et al. | 370/329 |
| 6,006,264 | 12/1999 | Colby et al. | 709/226 |
| 6,009,103 | 12/1999 | Woundy | 370/401 |
| 6,012,088 | 1/2000 | Li et al. | 709/219 |
| 6,013,107 | 1/2000 | Blackshear et al. | 703/229 |
| 6,014,545 | 1/2000 | Wu et al. | 455/3.1 |
| 6,018,767 | 1/2000 | Fijolek et al. | 709/218 |
| 6,041,041 | 3/2000 | Ramanathan et al. | 370/241 |
| 6,049,546 | 4/2000 | Ramakrishnan | 370/412 |
| 6,049,826 | 4/2000 | Beser | 709/222 |
| 6,052,724 | 4/2000 | Willie et al. | 709/223 |
| 6,058,421 | 5/2000 | Fijolek et al. | 709/225 |
| 6,065,049 | 5/2000 | Beser | 709/218 |
| 6,070,246 | 5/2000 | Beser | 713/201 |
| 6,075,787 | 6/2000 | Bobeck et al. | 370/395 |
| 6,091,709 | 7/2000 | Harrison et al. | 370/235 |
| 6,094,431 | 7/2000 | Yamato et al. | 370/395 |
| 6,130,880 | 10/2000 | Naudus et al. | 370/235 |
| 6,137,793 | * 10/2000 | Gorman et al. | 370/360 |
| 6,157,965 | 12/2000 | Mohammed et al. | 710/8 |
| 6,170,061 | 1/2001 | Beser | 713/201 |

OTHER PUBLICATIONS

"Operations Support System Interface Specification Baseline Privacy Interface MIB (Interim) SP–OSSI–B-PI–I01980331", MCNS Holdings, L.P., 1997, pgs. 1 to 30.

"Cable Modem Termination System–Network Side Interface Specification (Interim Specification) SP–CMTS–N-SII01–960702", MCNS Holdings, L.P., 1996, pgs. ii to 13.

"Baseline Privacy Interface Specification (Interim) SP–BPI–101–970922", MCNS Holdings, L.P., 1997, pgs. ii to 66.

"Removable Security Module Interface Specification (Interim Specification) SP–RSMI–I01–980204", MCNS Holdings, L.P., 1997, pgs. ii to 48.

"Operations Support System Interface Specification (Interim) SP–OSSII01–970403", MCNS Holdings, L.P., 1997, pgs. 1 to 30.

"Radio Frequency Interface Specification (Interim Specification) SP–RFI–102–971008", MCNS Holdings, L.P., 1997, pgs. ii to 186.

"Cable Moderm Technology Return Interface Specification (Interim) SP–CMTRI–101–970804" MCNS Holdings, L.P., 1997, pgs. ii to 74.

"Security System Specification (Interim Specification) SP–SSI–I01–970506", MCNS Holdings, L.P., 1997, pgs ii to 103.

"Internet Engineering Task Force, Request for Comments 2131, Dynamic Host Configuration Protocol (DHCP)", Mar. 1997, pgs. 1 to 42.

S. Adiraju, J. Fijolek, IPCDN Telephony Return MIB, Internet Engineering Task Force," <draft–ietf–ipcdn–tri–mib–00.1.txt>," Mar. 23, 1998, pgs. 1 to 26.

Kyees, P.J. et al., *ADSL: A New Twisted–Pair Access to the Information Highway*, IEEE Communications Magazine, vol. 33, Issue 4, Apr. 1995, pp. 52–60.

Huang, Yin–Hwa et al., *Design of an MPEG–Based Set–Top Box for Video on Demand Services*, Acoustics, Speech, and Signal Processing, 1995, ICASSP–95., 1995 International Conference, vol. 4, ISBN: 0–7803–2431–5, May 9–12, 1995, pp. 2655–2658.

"A Solution for the Priority Queue Problem of Deadline–Ordered Service Disciplines," N.R. Figueira, IEEE International Conference on Computer Communications and Networks, Sep. 22–25, 1997, pp. 320–325.

* cited by examiner

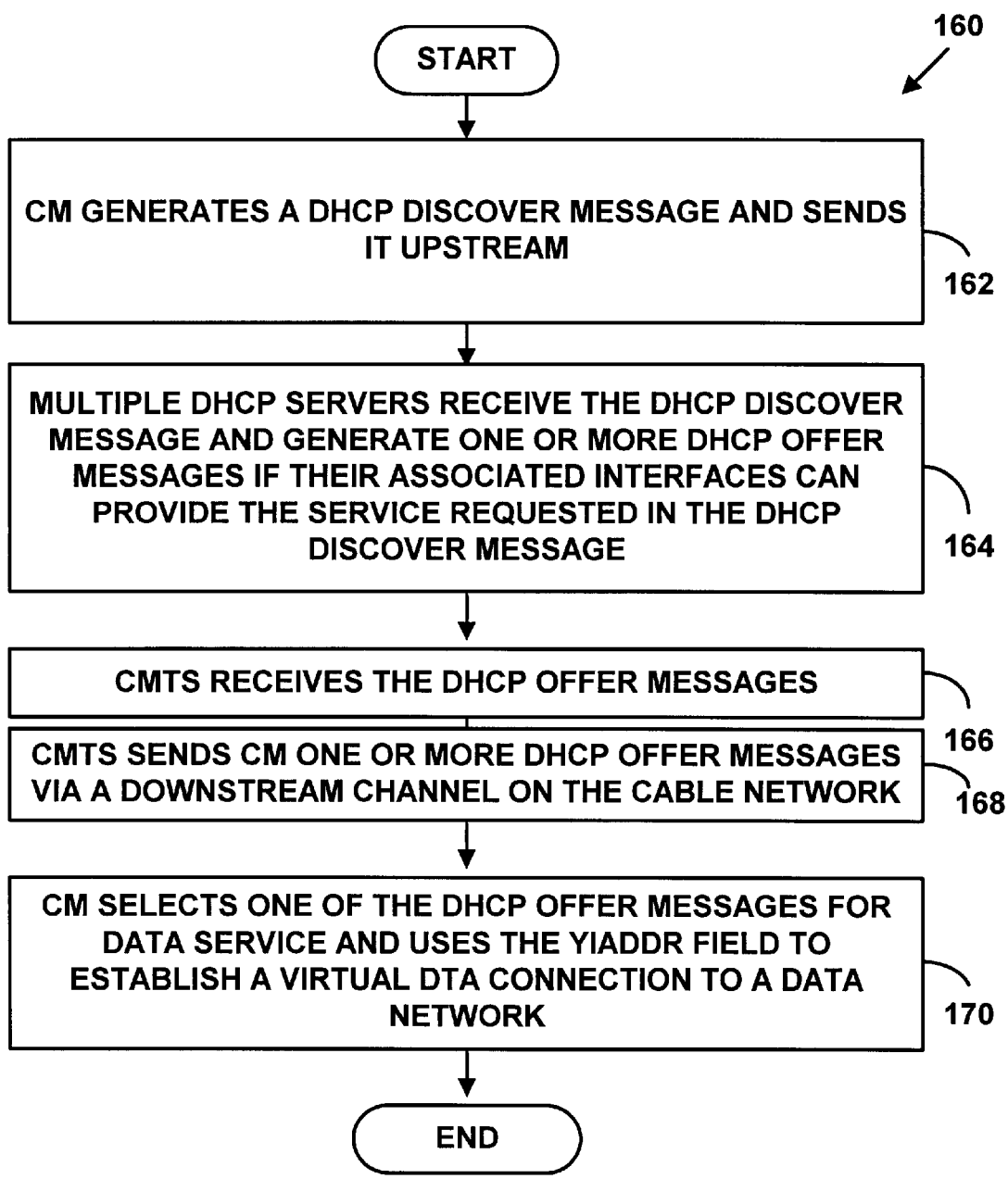

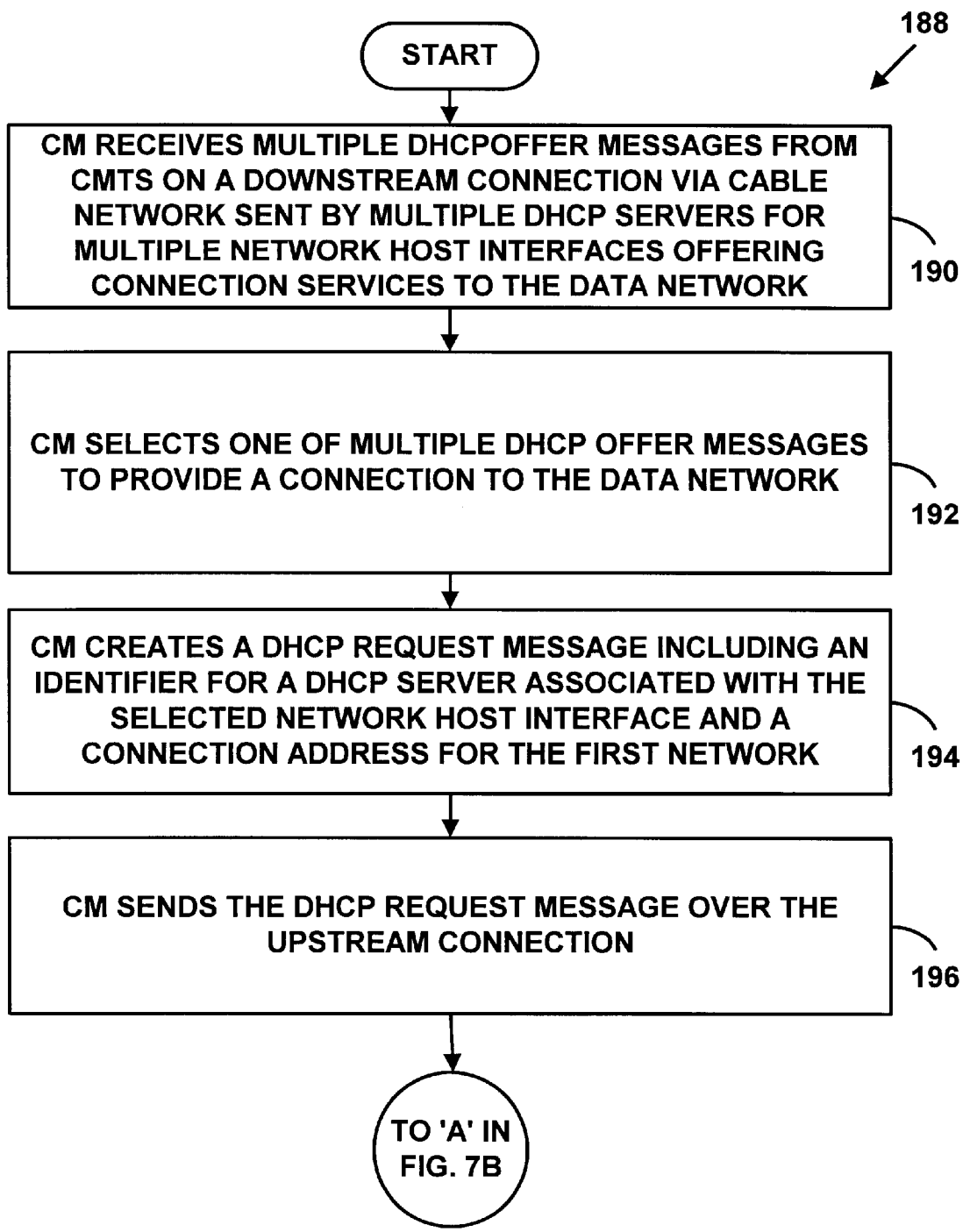

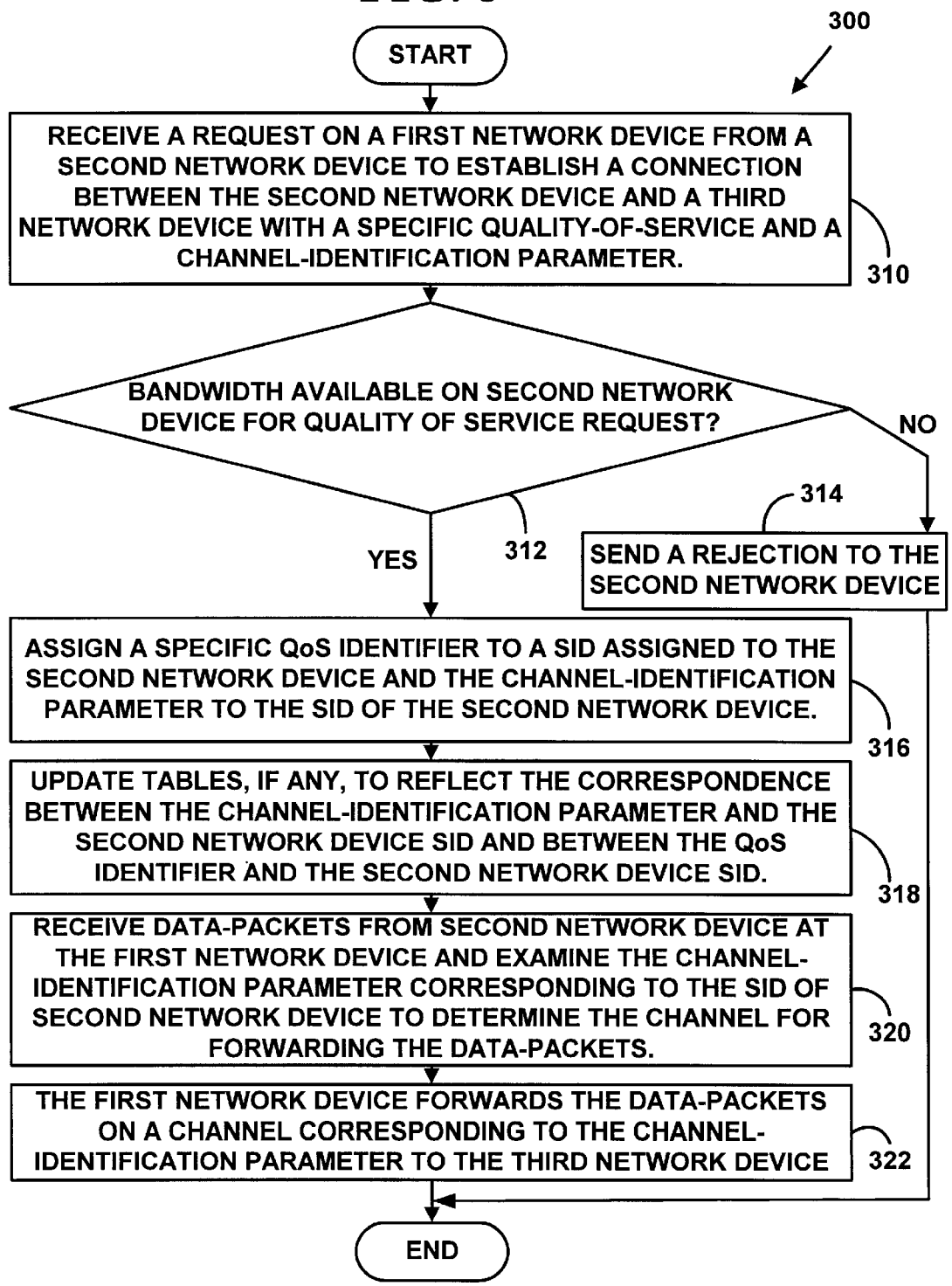

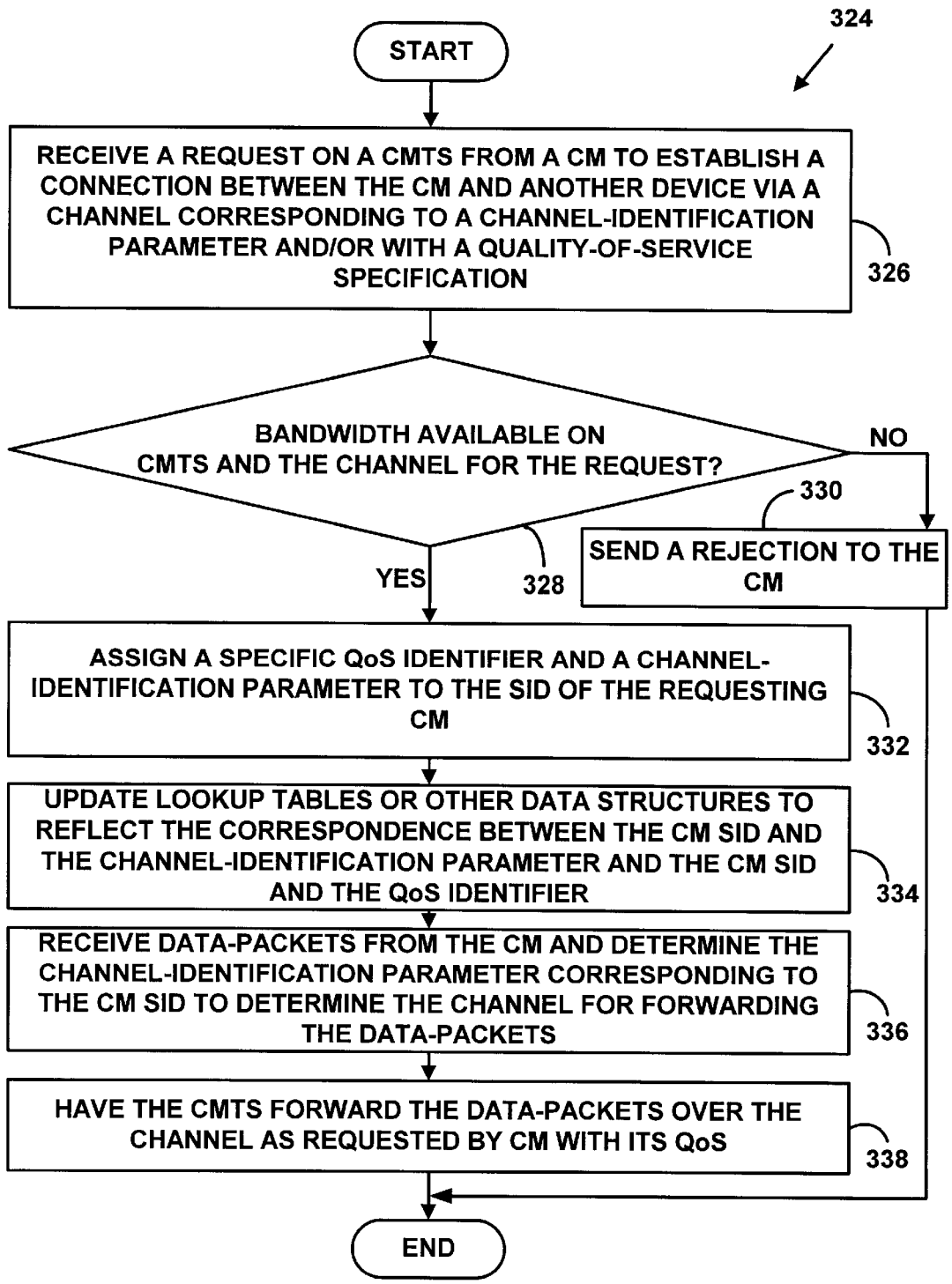

METHOD AND SYSTEM FOR BUNDLING DATA IN A DATA-OVER-CABLE SYSTEM

FIELD OF INVENTION

The present invention relates to communications in computer networks. More specifically, it relates to a method and system for bundling data in a data-over-cable system.

BACKGROUND OF THE INVENTION

The extensive wiring already undertaken to provide cable television service via cable networks and the large bandwidth, relative to that available on competing connections make it an attractive medium for providing access to services such as the Internet. The Internet, a world-wide-network of interconnected computers, provides multi-media content including audio, video, graphics and text that often require a large bandwidth for downloading and viewing.

Cable systems, as implemented today, have a tree structure. There is a "head-end" connected by branches to downstream nodes. A node may have a cable modem or other equipment to boost the signal strength, split the signal and other functions. These nodes are, in turn, connected by further branches to other nodes, with the tree finally terminating at customer premises. Coaxial or fiber-optic cables are used for branches although other connections, including wireless connections are possible. Ordinarily, there are no "closed loops" in such a system. In other words, there is typically only one functional downstream path from the head-end to any given node. Customer premise equipment communicates with the head-end of the cable system either by a return path outside of the cable system, or, in newer systems, with bandwidth from the cable network set aside for a return path.

Most Internet Service Providers allow customers to connect to the Internet via a telephone line connection to the Public Switched Telephone Network. The available data rates, usually less than 56,000 bps, are much slower than the about 10 Mbps to 30+ Mbps available on a coaxial cable or Hybrid Fiber/Coaxial cable network.

However, most cable television networks have installed uni-directional cable networks, supporting only a "downstream" data path. A downstream data path is the flow of data from a cable system head-end to a customer. Typically, a return, or "upstream," data path is via a telephone network (i.e., a "telephony return"). An upstream data path facilitates the flow of data to the cable system head-end. Upstream path also includes the flow of data to a device that sends data to the cable modem on a down-stream path. A cable system with an upstream connection to a telephony network is called a "data-over-cable system with telephony return." Some of the cable systems provide two-way service allowing use of some of the bandwidth in a cable network for upstream data paths.

An exemplary data-over-cable system includes a cable modem, a cable-modem-termination system at the head-end, a cable television network, equipment at the nodes for signal processing, and, possibly, a telephony-remote-access-concentrator to manage an upstream telephony path via the public-switched-telephone-network. The cable-modem-termination system and the telephony-remote-access-concentrator together comprise a "telephony-return-termination system."

A data-over-cable system is typically connected to other devices and networks such as the Internet. Most of the connections to other networks are made at the head-end. When telephony return is present, it is possible to address upstream traffic via the telephony-remote-access-concentrator to the Internet without having to go through the cable-modem-termination system. On the other hand, in a two-way data-over-cable system, in the absence of additional upstream paths the outgoing and incoming data go through the cable-modem-termination system.

The cable-modem-termination system, at the head-end, receives data-packets and transmits them downstream via the cable network to a cable modem, which may in turn send them on to customer premise equipment or further downstream. The customer premise equipment may respond by sending data-packets to the cable modem, which, in turn, sends the data-packets upstream.

When a cable modem in a data-over-cable system is initialized, at least one downstream path, typically 6 MHz wide, from the cable-modem-termination system to the cable modem is set up. Six MHz is also the typical bandwidth for a television channel. The allocation is made so as to ensure coexistence of television broadcasts and data connections. In addition, at least one upstream path, either within the cable network, or via an external connection like the public switched telephone network, is established. The upstream path, even when within the cable network, does not usually have a bandwidth of 6 MHz. The occupied frequency ranges are different as well. Downstream paths are typically in the range of 50 MHz to approximately 1 GHz while the upstream paths are within 5 MHz to 42 MHz with a specific slot defined by the cable-modem-termination system.

As a cable modem is initialized in a data-over-cable system, it registers with a cable-modem-termination system. As part of a registration request message, the cable modem forwards configuration information to the cable-modem-termination system. This exchange also establishes the properties of the cable modem to the cable-modem-termination system. If the data-over-cable system supports Quality-of-Service, data-over-cable system may allocate resources to the cable modem in the course of registration.

Configuration information forwarded to a cable-modem-termination system from a cable modem is accompanied by Class-of-Service and Quality-of-Service and other parameters. As is known in the art, Class-of-Service provides a reliable transport facility independent of the Quality-of-Service. Class-of-Service parameters include maximum downstream data rates, maximum upstream data rates, upstream channel priority, guaranteed minimum data rates, guaranteed maximum data rate and other parameters. Quality-of-Service collectively specifies the performance of a network service that a device expects on a network. Quality-of-Service parameters include transit delay expected to deliver data to a specific destination, the level of protection from unauthorized monitoring or modification of data, cost for delivery of data, expected residual error probability, the relative priority associated with the data and other parameters.

A cable-modem-termination system, at the head-end of the data-over-cable system, usually does not address the entire bandwidth, from approximately 50 MHz to about 1 GHz, available in the cable network. A cable-modem-termination system designed to address the entire bandwidth available in the cable network is typically not cost effective. This limitation is handled, in part, by utilizing more than one cable-modem-termination system at the head-end such that each cable-modem-termination system addresses only a fraction of the possible bandwidth. This is possible because many of the tasks can be performed in parallel without extensive cross-communications between the multiple cable-modem-termination systems.

Each cable-modem-termination system is an expensive asset. Hence, optimal utilization of its capacity is warranted. In light of the above, adding another cable-modem-termination system is not always the preferred option when faced with increased demands on the system. For instance, users may be allowed to access system resources only after registering and receiving approval for their requested use of system resources. This permits resource allocation based on satisfying the needs of users allowed access to the data-over-cable system and avoid a freezing up the entire system. At the same time system resources do not have to match peak demand while being idle most of the time.

Furthermore, an entire 6 MHz bandwidth of a downstream path is not exclusively used by a single cable modem. Efficient use of such a large bandwidth requires sending data to more than one cable modem by addressing data-packets to individual cable modems listening on the same downstream path. A data-over-cable system also permits addressing of data-packets to more than one cable modem by means of broadcast addressing. Despite these built in strategies to promote efficient use of data-over-cable system resources, cable-modem-termination system resources are not typically used efficiently in a data-over-cable system.

SUMMARY OF THE INVENTION

In accordance with a preferred embodiment of the present invention, the problems associated with allocation and use of data-over-cable system resources are overcome. Methods and system for allocating and controlling access to channels linking the data-over-cable system to other devices are provided.

The methods and system include a first network device which forwards data received from a second network device on multiple channels. One or more of these channels are labeled with a channel-identification parameter. The second network device sends data-packets labeled with a data-identification parameter. A given data-packet is forwarded on a channel labeled by a channel-identification parameter corresponding to a data-identification parameter of the data-packet. It is also possible to have default channels when no data-identification parameter is associated with a data-packet.

In a preferred embodiment of the present invention, the first network device is a cable-modem-termination system and the second network device is a cable modem. However, the present invention is not limited to these devices and other network devices can also be used.

The method includes labeling channels available at a head-end of the data-over-cable system. Preferably, each label corresponds to a single channel. A single channel is not just a physical connection, but is also a virtual channel defined for the purpose of communicating with a given destination, error tolerance, priority or other parameters. A labeled virtual channel offers better utilization of system resources by accommodating applications with very different needs. In one implementation, a channel may be a dedicated line to a particular entity. Thus, communications to that entity may be forwarded on the specified channel.

Data from a given application is designated for a channel. At the head-end of the data-over-cable system data are transmitted on the designated channel. As an example, a table may be constructed relating a channel-identification parameter to a corresponding Service IDentifier ("Service-ID"). A Service-ID is an identifier for a particular device or process in the data-over-cable system. If a device or application is supporting several different tasks, each of the tasks may be assigned its own Service-ID. Each Service-ID may have a corresponding channel-identification parameter, also referred to as a group-IDentifier (group-ID) or flow-IDentifier (flow-ID). More than one Service-ID may correspond to the same channel-identification parameter, but a given Service-ID corresponds to only one channel-identification parameter. Assignment of only one channel-identification parameter to a Service-ID is not a necessary condition imposed by the invention, but merely an implementation detail.

Data from a given Service-ID are targeted to the corresponding channel. Sufficient capacity may be reserved on the channel as part of the Quality-of-Service negotiations. The foregoing and other features and advantages of a preferred embodiment of the present invention will be more readily apparent from the following detailed description, which proceeds with references to the accompanying drawings.

BRIEF DESCRIPTION OF THE DRAWINGS

FIGS. 6 is a flow diagram illustrating a method for discovering hosts in a cable modem system;

FIG. 7A and 7B are a flow diagrams illustrating a method for resolving discovered host addresses;

FIG. 8 is a flow diagram of a method for specifying the channel for data-packets; and FIG. 9 is a flow diagram of a possible implementation of the method for specifying the path for data-packets in a preferred embodiment.

DETAILED DESCRIPTION OF A PREFFERED EMBODIMENT

Cable Modem System with Telephony Return

Figure 1:
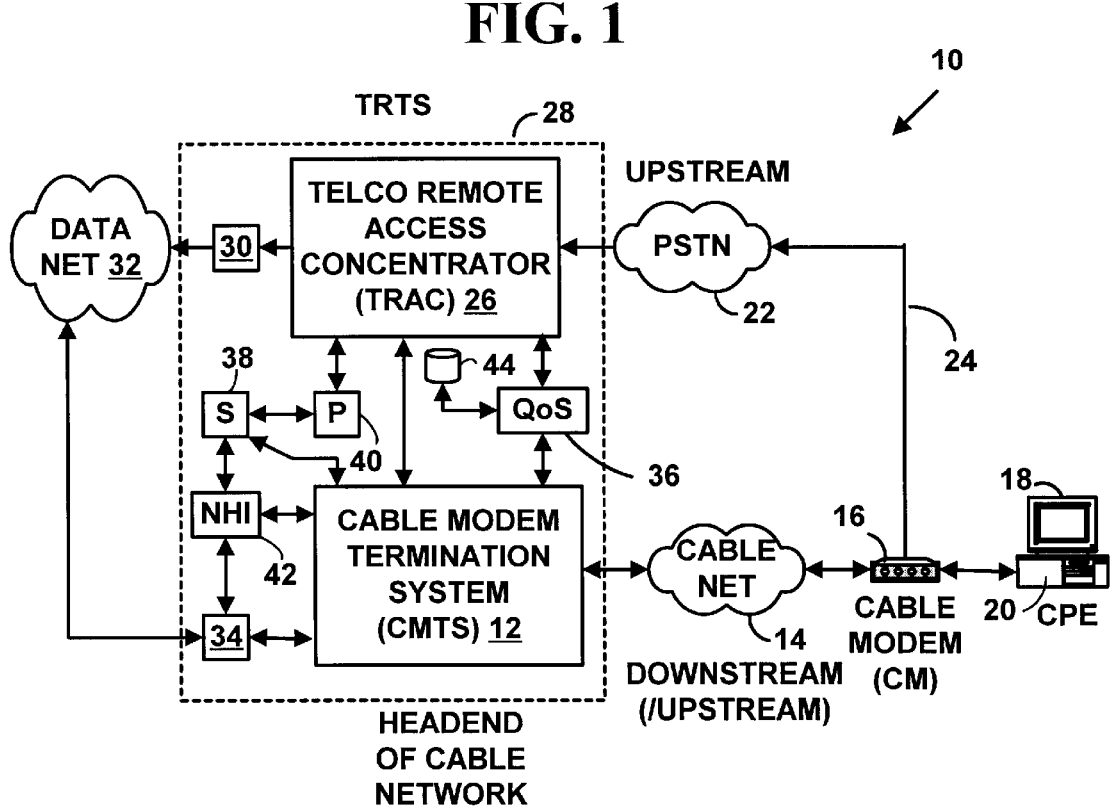
FIG. 1 is a block diagram illustrating a cable modem system with the optional telephony return.

FIG. 1 is a block diagram illustrating a data-over-cable system with telephony return 10, hereinafter data-over-cable system 10. However, data-over-cable system 10 of the present invention may also provide a bi-directional data path (i.e., both downstream and upstream) without telephony return as is also illustrated in FIG. 1.

Data-over-cable system 10 includes a cable-modem-termination system ("CMTS") 12 connected to a cable television network 14, hereinafter cable network 14. Cable network 14 includes cable television networks such as those provided by Comcast Cable Communications, Inc., of Philadelphia, Pa., Cox Communications, or Atlanta, Ga., Tele-Communications, Inc., of Englewood Colo., Time-Warner Cable, of Marietta, Ga., Continental Cablevision, Inc., of Boston, Mass., and others. Cable modem ("CM") 16, such as those provided by 3Com Corporation of Santa Clara, Calif., U.S. Robotics Corporation of Skokie, Ill., Motorola Corporation of Schaumburg, Ill. and others, offer higher-speed connectivity to customers at a "downstream" data rate of 30+ Mbps which is a much higher data rate than can be supported by serial telephone line used over a modem.

CM 16 is connected to Customer Premise Equipment ("CPE") 18 such as a personal computer system via a Cable Modem-to-CPE Interface ("CMCI") 20. CM 16 is connected to the Public Switched Telephone Network ("PSTN") 22 when an upstream telephony connection 24 is provided. The upstream telephony connection 24 is any of a standard telephone line connection, Integrated Services Digital Network ("ISDN") connection, Asymmetric Digital Subscriber Line ("ADSL") connection, or other telephony connection. PSTN 22 is connected to a Telephony Remote Access Concentrator ("TRAC") 26. In a data-over-cable system without telephony return, CM 16 has an upstream connection to CMTS 12 via the cable network 14 or via other technologies to send data upstream.

CMTS 12 and TRAC 26 may be at a "head-end" of data-over-cable system 10, or TRAC 26 may be located elsewhere and have routing associations to CMTS 12. TRAC 26 is not required if the upstream path is via the cable network 14. CMTS 12 and TRAC 26 together are called a "Telephony Return Termination System" ("TRTS") 28. The dashed box in FIG. 1 shows the TRTS 28. CMTS 12 and TRAC 26 make up TRTS 28 whether or not they are located at the head-end of cable network 14, and TRAC 26 may in located in a different geographic location from CMTS 12. Content servers, operations servers, administrative servers and maintenance servers used in data-over-cable system 10 may be in different locations or a part of CMTS 12. Access points to data-over-cable system 10 are connected to one or more CMTS's 12 or cable head-end access points. Such configurations may be "one-to-one", "one-to-many," or "many-to-many," and may be interconnected to other Local Area Networks ("LANs") or Wide Area Networks ("WANs").

TRAC 26 is connected to data networks 32 (e.g., the Internet or an Intranet) by a TRAC-Network System Interface 30 ("TRAC-NSI"). CMTS 12 is connected to a plurality of data networks 32 by a CMTS-Network System Interface ("CMTS-NSI") 34. The present invention is not limited to data-over-cable system 10 illustrated in FIG. 1, and more or fewer components, connections and interfaces could also be used.

The servers associated with or integral to CMTS 12 include the Quality-of-Service ("QoS") server 36 and the DHCP server 38 and DHCP server proxies 40. The DHCP server proxies 40 are used to allow the CM 16 to communicate with the DHCP servers 38 during initialization in cable-systems-with-telephony-return. This is not necessary in bi-directional data-over-cable systems.

In addition, FIG. 1 shows the network host interface 42, which is addressed by data-packets being sent to the data-over-cable system. Available addresses in the network host interface 42 can be associated with a SID so that CMTS 12 may route traffic addressed to an address in network host interface 42, to an application corresponding to the associated SID. The QoS server 36 updates a database 44 of the available service capacity on the CMTS 12. The service capacity includes the bandwidth and other parameters included in QoS specifications. QoS server uses the database 44 to track available system resources including bandwidth available on a CMTS 12. In other embodiments some or all of the functions of these servers may be dispensed with, or, alternatively, be made integral to the CMTS 12.

Cable Modem Protocol Stack

Figure 2:
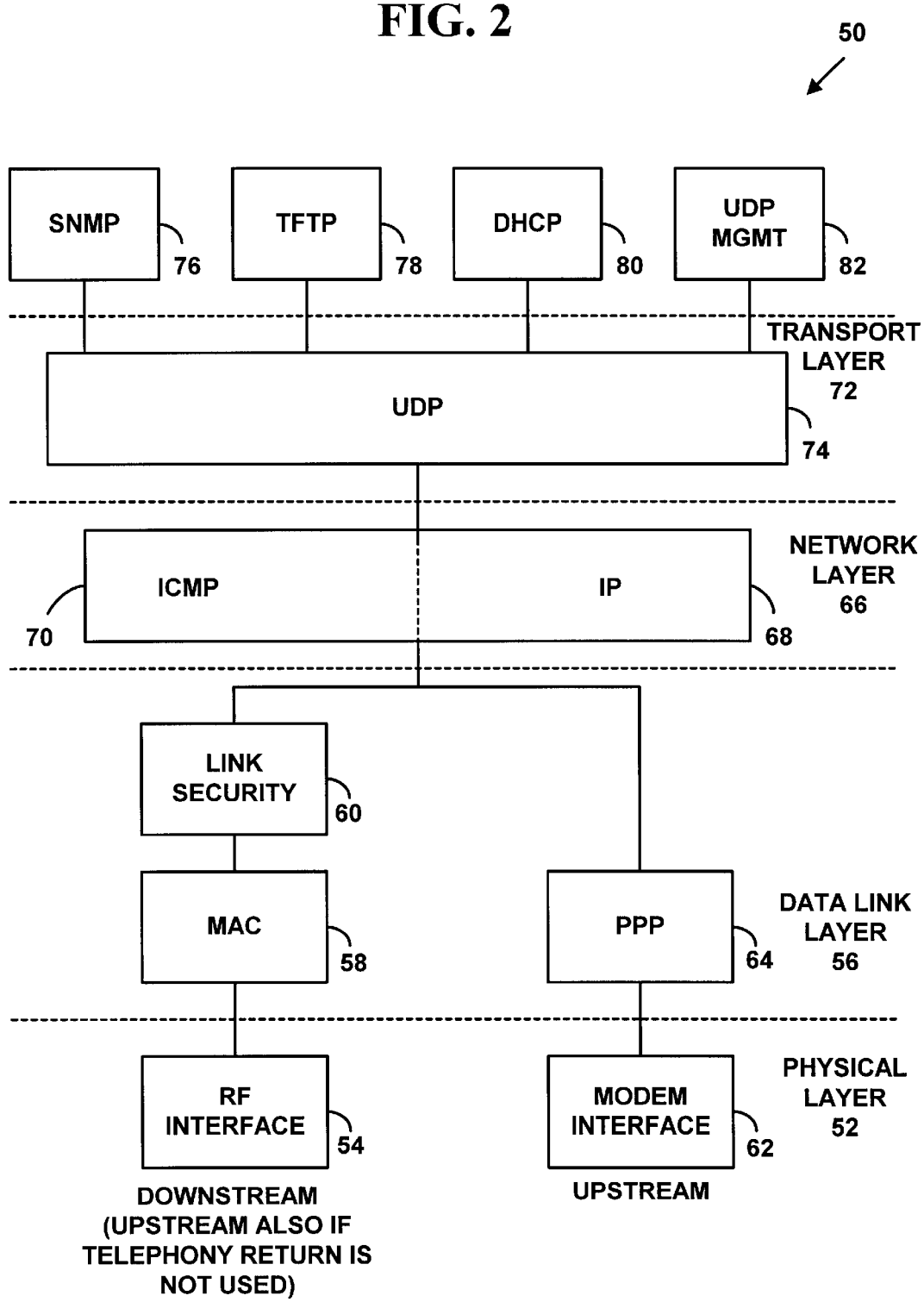
FIG. 2 is a block diagram illustrating a protocol stack for a cable modem.

FIG. 2 is a block diagram illustrating a protocol stack 50 for CM 16. FIG. 2 illustrates the downstream and upstream protocols used in CM 16. As is known in the art, the Open System Interconnection ("OSI") model is used to describe computer networks. The OSI model consists of seven layers including from lowest-to-highest, a physical, data-link, network, transport, session, application and presentation layer. The physical layer transmits bits over a communication link. The data link layer transmits error free frames of data. The network layer transmits and routes data-packets.

For downstream data transmission, CM 16 is connected to cable network 14 in a physical layer 52 via a Radio Frequency ("RF") Interface 54. In a preferred embodiment of the present invention, RF Interface 54 has an operation frequency range of 50 Mega-Hertz ("MHz") to 1 Giga-Hertz ("GHz") and a channel bandwidth of 6 MHz. However, other operation frequencies may also be used and the invention is not limited to these frequencies. RF interface 54 uses a signal modulation method of Quadrature Amplitude Modulation ("QAM"). As is known in the art, QAM is used as a means of encoding digital information over radio, wire, or fiber optic transmission links. QAM is a combination of amplitude and phase modulation and is an extension of multiphase phase-shift-keying. QAM can have any number of discrete digital levels typically including 4, 16, 64 or 256 levels. In one embodiment of the present invention, QAM-64 is used in RF interface 54. For more information on RF interface 40 see the Institute of Electrical and Electronic Engineers ("IEEE") standard 802.14 for cable modems incorporated herein by reference. IEEE standards can be found on the World Wide Web at the Universal Resource Locator ("URL") "www.ieee.org." However, other RF interfaces 54 or frequency modulation techniques could also be used and the present invention is not limited to IEEE 802.14 (e.g., RF interfaces from Multimedia Cable Network Systems ("MCNS") and other could also be used).

Upstream connections do not necessarily use the same modulation schemes, even in a two-way data-over-cable system. Upstream packets in a two-way data-over-cable system may be modulated in accordance with Quadrature Phase Shift Keying ("QPSK") or 16QAM modulation schemes. QAM is a modified version of QPSK, the difference being that the amplitude may also be varied in QAM. See Albert Azzam, "High Speed Cable Modems" published by McGraw-Hill, New York, 1997, incorporated herein by reference.

Above RF interface 54 in a data-link layer 56 is a Medium Access Control ("MAC") layer 58. As is known in the art, MAC layer 58 controls access to a transmission medium via physical layer 52. For more information on MAC layer protocol 58 see IEEE 802.14 for cable modems. However, other MAC layer protocols 58 could also be used and the present invention is not limited to IEEE 802.14 MAC layer protocols (e.g., MCNS MAC layer protocols and others could also be used).

Above MAC layer 58 is an optional link security protocol stack 60. Link security protocol stack 60 prevents unauthorized users from making a data connection from cable network 14. RF interface 54 and MAC layer 58 can also be used for an upstream connection if data-over-cable system 10 is used without telephony return.

Above modem interface 62 in data link layer 56 is Point-to-Point Protocol ("PPP") layer 64, hereinafter PPP 64. As is known in the art, PPP is used to encapsulate network layer datagrams over a serial communications link. For more information on PPP see Internet Engineering Task Force ("IETF") Request for Comments ("RFC"), RFC-1661, RFC-1662 and RFC-1663 incorporated herein by reference. Information for IETF RFCs can be found on the World Wide Web at URLs "ds.internic.net" or "www.ietf.org."

Above both the downstream and upstream protocol layers in a network layer 66 is an Internet Protocol ("IP") layer 68. IP layer 68, hereinafter IP 68, roughly corresponds to OSI layer 3, the network layer, but is typically not defined as part of the OSI model. As is known in the art, IP 68 is a routing protocol designed to route traffic within a network or between networks. For more information on IP 68 see RFC-791 incorporated herein by reference.

Internet Control Message Protocol ("ICMP") layer 70 is used for network management. The main functions of ICMP layer 70, hereinafter ICMP 70, include error reporting, reachability testing (e.g., "pinging") congestion control, route-change notification, performance, subnet addressing and others. Since IP 68 is an unacknowledged protocol, datagrams may be discarded and ICMP 70 is used for error reporting. For more information on ICMP 70 see RFC-971 incorporated herein by reference.

Above IP 68 and ICMP 70 is a transport layer 72 with User Datagram Protocol layer 74 ("UDP"). UDP layer 74, hereinafter UDP 74, roughly corresponds to OSI layer-4, the transport layer, but is typically not defined as part of the OSI model. As is known in the art, UDP 74 provides a connectionless mode of communications with datagrams. For more information on UDP 74 see RFC-768 incorporated herein by reference.

Above the network layer are a Simple Network Management Protocol ("SNMP") layer 76, Trivial File Transfer Protocol ("TFTP") layer 78, Dynamic Host Configuration Protocol ("DHCP") layer 80 and a UDP manager 82. SNMP layer 76 is used to support network management functions. For more information on SNMP layer 76 see RFC-1157 incorporated herein by reference. TFTP layer 78 is a file transfer protocol used to download files and configuration information. For more information on TFTP layer 78 see RFC-1350 incorporated herein by reference. DHCP layer 80 is a protocol for passing configuration information to hosts on an IP 68 network. For more information on DHCP layer 80 see RFC-1541 incorporated herein by reference. UDP manager 82 distinguishes and routes packets to an appropriate service (e.g., a virtual tunnel). More or fewer protocol layers may be used with data-over-cable system 10.

CM 16 supports transmission and reception of IP 68 datagrams as specified by RFC-791. CMTS 12 and TRAC 26 may perform filtering of IP 68 datagrams. CM 16 is configurable for IP 68 datagram filtering to restrict CM 16 and CPE 18 to the use of only their assigned IP 68 addresses. CM 16 is configurable for IP 68 datagram UDP 74 port filtering (i.e., deep filtering).

CM 16 forwards IP 68 datagrams addressed to an IP 68 unicast address across cable network 14 or PSTN 22. CM 16 also forwards IP 68 datagrams destined to an IP 68 multicast address across cable network 14 or PSTN 22. CM 16 is configurable to keep IP 68 multicast routing tables and to use group membership protocols. CM 16 is also capable of IP 68 tunneling upstream through the telephony path. A CM 16 that wants to send a multicast packet across a virtual tunnel will prepend another IP 68 header with the destination address to be the unicast address of CMTS 12 at the other end of the tunnel, and the IP 68 protocol field to be four.

CMTS 12 at the other end of the virtual tunnel receives the packet, strips off the encapsulating IP 68 header, and forwards the packet as appropriate. A broadcast IP 68 capability is dependent upon the configuration of the direct linkage, if any, between TRAC 26 and CMTS 12. CMTS 12, CM 16, and TRAC 26 are capable of routing IP 68 datagrams destined to an IP 68 broadcast address which is across cable network 14 or PSTN 22 if so configured. CM 16 is configurable for IP 68 broadcast datagram filtering.

An operating environment for CM 16 of the present invention includes a processing system with at least one high speed Central Processing Unit ("CPU") and a memory system. In accordance with the practices of persons skilled in the art of computer programming, the present invention is described below with reference to acts and symbolic representations of operations that are performed by the processing system, unless indicated otherwise. Such acts and operations are sometimes referred to as being "computer-executed", or "CPU executed."

The acts and symbolically represented operations include the manipulation of electrical signals by the CPU. Similar manipulation of optical signals is possible. These signals represent data bits which cause the maintenance of data bits at memory locations in the memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium. The computer readable medium includes cooperating or interconnected computer readable media, which exist exclusively on the processing system or is distributed among multiple interconnected processing systems that may be local or remote to the processing system.

Initialization of a Cable Modem

When CM 16 is initially powered on, if telephony return is being used, CM 16 will scan downstream slots of 6 MHz bandwidth until it finds one that is available. CM 16 waits to receive an Upstream Channel Descriptor ("UCD") from CMTS 12 that is used to provide dialing and access instructions on downstream channels via cable network 14. UCD provides information for upstream communications with CMTS 12. UCD is transmitted as a MAC management message with a management type value of TRI_UCD at a periodic interval (e.g., every 2 seconds). To provide for flexibility, the UCD message parameters are encoded in a Type/Length/Value ("TLV") form. However, other encoding techniques could also be used.

Figure 3:
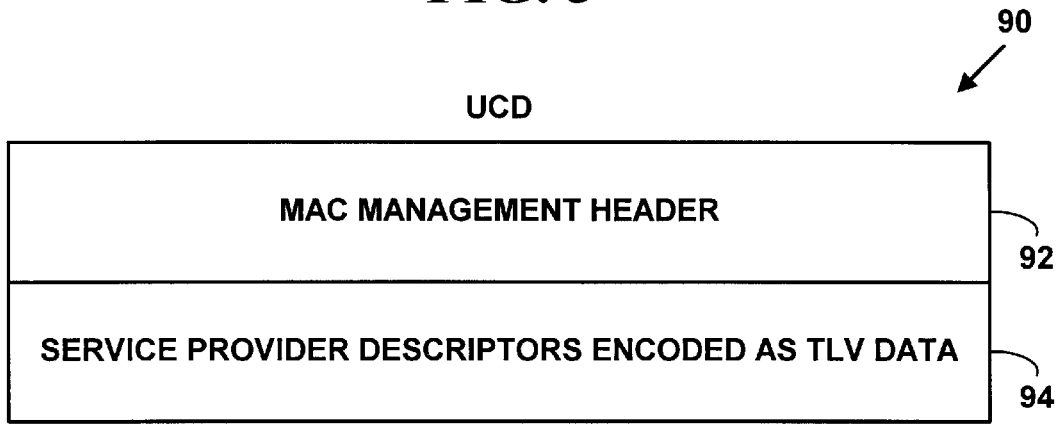
FIG. 3 is a block diagram illustrating a Upstream Channel Descriptor message structure.

FIG. 3 is a block diagram illustrating a UCD message structure 90 with MAC 58 management header 92 and Service Provider Descriptor(s) ("SPD") 94 encoded in TLV format. SPDs 94 are compound TLV encodings of transmission parameters for all available upstream communication paths. SPD 94 is contained within UCD message 90. There may be multiple SPD 94 encodings within a single UCD message 90. There is at least one SPD 94 in UCD message 90. SPD 94 parameters are encoded as SPD-TLV tuples.

A Termination System information ("TSI") message is transmitted by CMTS 12 at periodic intervals (e.g., every 2 seconds) to report CMTS 12 information to CM 16 whether or not telephony return is used. The TSI message is transmitted as a MAC 58 management message. The TSI provides a CMTS 12 boot record in a downstream channel to CM 16 via cable network 14. CM 16 uses the information in the TST to obtain information about the status of CMTS 12. The TSI message has a MAC 58 management type value of TRI_TSI.

Figure 4:
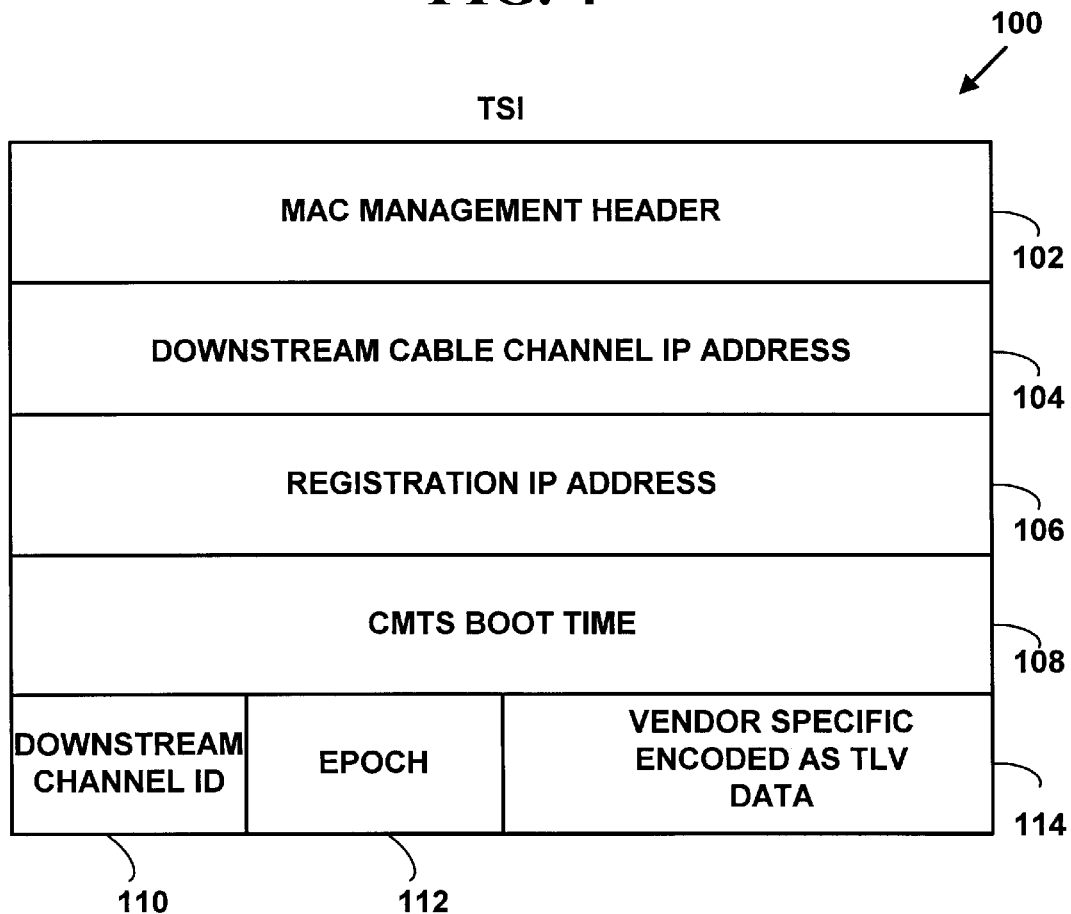
FIG. 4 is a block diagram illustrating a Termination System Information message structure.

FIG. 4 is a block diagram of a TSI message structure 100. TSI message structure 100 include a MAC 58 management header 102, a downstream channel IP address 104, a registration IP address 106, a CMTS 12 boot time 108, a downstream channel identifier 110, an epoch time 112 and vendor specific TLV encoded data 114.

A description of the fields of TSI message 100 is shown in Table 1. However, more or fewer fields could also be used in TSI message 100.

TABLE 1

| TSI 100 Parameter | Description |
|---|---|
| Downstream Channel IP Address 104 | This field contains an IP 68 address of CMTS 12 available on the downstream channel this message arrived on. |
| Registration IP Address 106 | This field contains an IP 68 address to which CM 16 sends its registration request messages. This address MAY be the same as the Downstream Channel IP 104 address. |
| CMTS Boot Time 108 | Specifies an absotute-time of a CMTS 12 recorded epoch. The clock setting for this epoch uses the current clock time with an unspecified accuracy. Time is represented as a 32 bit binary number. |
| Downstream Channel ID 110 | A downstream channel on which this message has been transmitted. This identifier is arbitrarily chosen by CMTS 12 and is unique within the MAC 58 layer. |
| Epoch 112 | An integer value that is incremented each time CMTS 12 is either reinitialized or performs address or routing table flush. |
| Vendor Specific Extensions 114 | Optional vendor extensions may be added as TLV encoded data. |

After receiving UCD 90 message and TSI message 100, CM 16 continues to establish access to data network 32 (and resources on the network) by "upstream" communications to CMTS 12. CM 16 completes a virtual data connection by discovering network host interface addresses available on CMTS 12 (e.g., IP host interfaces 42 for a virtual IP 68 connection). The virtual data connection allows CM 16 to receive data from data network 32 via CMTS 12 and cable network 14. CM 16 must first determine an address of a host interface address (e.g., an IP 68 interface) available on CMTS 12 that can be used by data network 32 to send data to CM 16.

Dynamic Network Host Configuration on Data-over-cable System

As was illustrated in FIG. 2, CM 16 has a Dynamic Host Configuration Protocol ("DHCP") layer 80 to provide configuration parameters to hosts. DHCP 80 consists of two components: a protocol for delivering configuration parameters from a DHCP 80 server to a host and a mechanism for allocation of network host-addresses to clients. DHCP 80 is built on a client-server model, where designated DHCP 80 servers allocate host addresses and deliver configuration parameters to dynamically configured clients.

Figure 5:
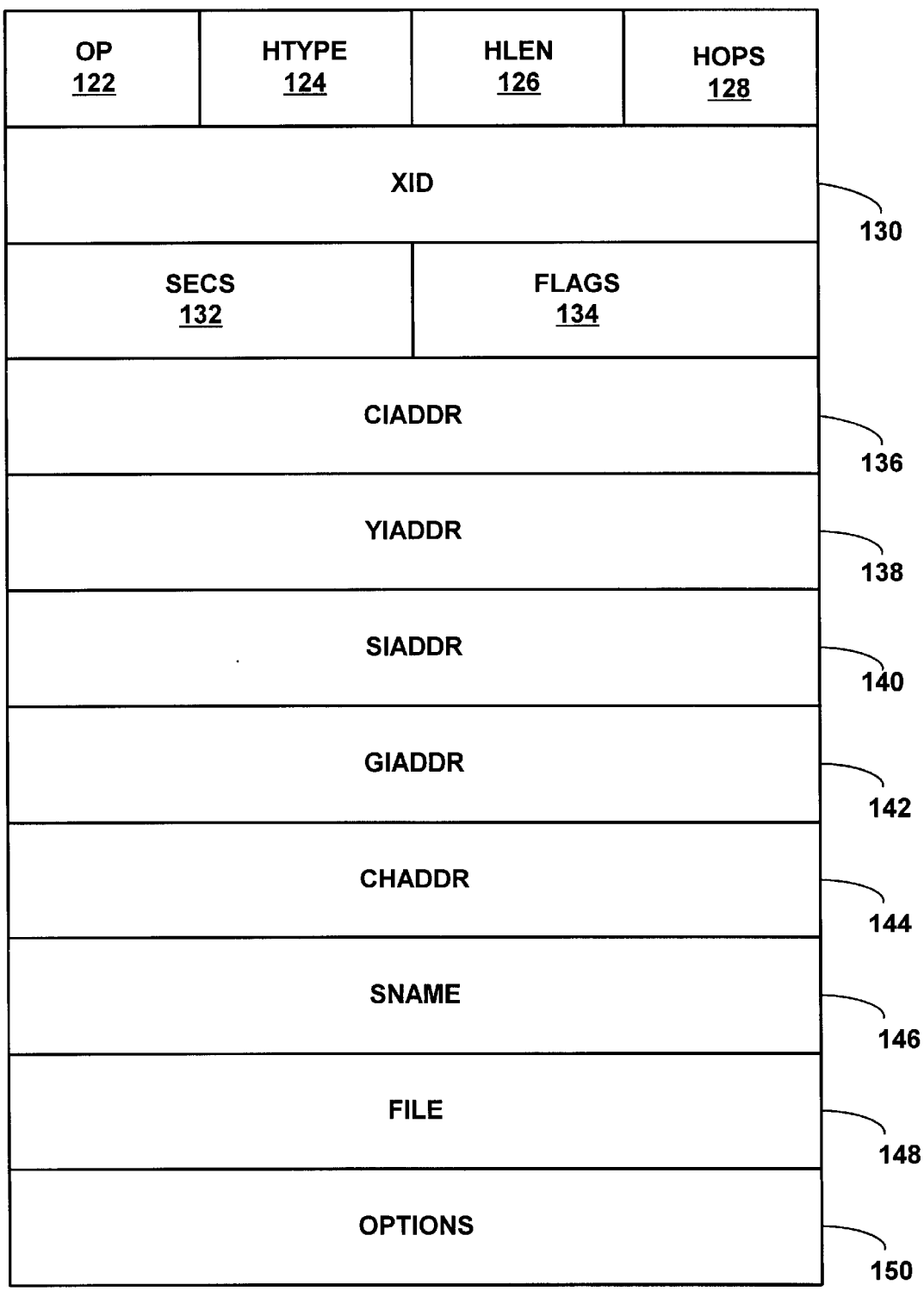
FIG. 5 is a block diagram illustrating a Dynamic Host Configuration Protocol message structure.

FIG. 5 is a block diagram illustrating a DHCP 80 message structure 108. The format of DHCP 80 messages is based on the format of BOOTstrap Protocol ("BOOTP") messages described in RFC-951 and RFC-1542 incorporated herein by reference. DHCP 80 message structure 120 includes an operation code field 122 ("op"), a hardware address type field 124 ("htype"), a hardware address length field 126 ("hlen"), a number of hops field 128 ("hops"), a transaction identifier field 130 ("xid"), a seconds elapsed time field 132 ("secs"), a flags field 134 ("flags"), a client IP address field 136 ("ciaddr"), a your IP address field 138 ("yiaddr"), a server IP address field 140 ("siaddr"), a gateway/relay agent IP address field 142 ("giaddr"), a client hardware address field 144 ("chaddr"), an optional server name field 146 ("sname"), a boot file name 148 ("file") and an optional parameters field 150 ("options"). Descriptions for DHCP 80 message 120 fields are shown in Table 2.

TABLE 2

| DCHP 80 Parameter | Description |
|---|---|
| OP 122 | Message op code/message type. 1 BOOTREQUEST, 2 = BOOTREPLY. |
| HTYPE 124 | Hardware address type (e.g., '1' = 10 Mps Ethernet). |
| HLEN 126 | Hardware address length (e.g., '6' for 10 Mps Ethernet). |
| HOPS 128 | Client sets to zero, optionally used by relay-agents when booting via a relay-agent. |
| XID 130 | Transaction ID, a random number chosen by the client, used by the client and server to associate messages and responses between a client and a server. |
| SECS 132 | Filled in by client, seconds elapsed since client started trying to boot. |
| FLAGS 134 | Flags including a BROADCAST bit. |
| CIADDR 136 | Client IP address; filled in by client in DHCPREQUEST if verifying previously allocated configuration parameters. |
| YIADDR 138 | 'Your' IP address. |
| SIADDR 140 | IP 68 address of next server to use in bootstrap; returned in DHCPOFFER, DHCPACK and DHCPNAK by server. |
| GIADDR 142 | Gateway relay agent IP 68 address, used in booting via a relay-agent. |
| CHADDR 144 | Client hardware address (e.g., MAC layer 58 address). |
| SNAME 146 | Optional server host name, null terminated string. |
| FILE 148 | Boot file name, terminated by a null string. |
| OPTIONS 150 | Optional parameters. |

The DHCP 80 message structure shown in FIG. 5 is used to discover IP 68 and other host addresses in data-over-cable system 10. A client (e.g., CM 16) uses DHCP 80 to acquire or verify an IP 68 address and network parameters. Table 3 illustrates a typical use of the DHCP 80 protocol.

TABLE 3

1. A client broadcasts a DHCP 80 discover message on its local physical subnet. The DHCP 80 discover message may include options that suggest values for a network host interface address. BOOTP relay agents may pass the message on to DHCP 80 servers not on the same physical subnet.
2. DHCP servers may respond with a DHCPOFFER message that includes an available network host interface address in the 'yiaddr' field. DHCP 80 servers unicasts the DHCPOFFER message to the network host client, or may broadcast the message to a broadcast address (preferably 255.255.255.255) on the client's subnet.
3. The client receives one or more DHCPOFFER messages from one or more DHCP 80 servers. The client may choose to wait for multiple responses.
4. The client chooses one DHCP 80 server from which to request configuration parameters, based on the configuration parameters offered in the DHCPOFFER messages.

To discover the available IP 68 host interface addresses on CMTS 12, CM 16 has to communicate with CMTS 12. At step 162 in FIG. 6, after receiving a TSI message 100 from CMTS 12 on a downstream connection, CM 16 generates a DHCP discover ("DHCPDISCOVER") message and sends it upstream. One or more DHCP 80 servers receive the DHCPDISCOVER message and generate a DHCP 80 offer message ("DHCPOFFER") at step 164.

The DHCP 80 offer message is an offer of configuration parameters sent to the client (e.g., CM 16) in response to a DHCPDISCOVER message. The DHCP 80 offer message is sent with the message fields set as illustrated in Table 4, including an IP 68 address for a network host interface available on CMTS 12.

TABLE 4

| DHCP 80 Parameter | Description |
| --- | --- |
| FLAGS 134 | BROADCAST bit set to zero. |
| YIADDR 138 | IP 68 address from a network host interface to allow CM 16 to receive data from data network 28 via a network host interface available on CMTS 12. |
| SIADDR 140 | An IP 68 address for a TFTP 78 server to download configuration information for an interface host. |
| CHADDR 1 44 | MAC 58 address of CM 16. |
| SNAME 146 | Optional DHCP 80 server identifier with an interface host. |
| FILE 148 | A TFTP 78 configuration file name for CM 16. |

At step 166 in FIG. 6, CMTS 12 receives one or more DHCPOFFER messages from one or more DHCP 80 servers. CMTS 12 examines DHCP 80 yiaddr-field 138 and DHCP 80 chaddr-field 144 in the DHCPOFFER messages and sends the DHCPOFFER messages to CM 16 via cable network 14. CMTS 12 knows the frequency location of CM 16 since it sent CM 16 a MAC 58 layer address in one or more initialization messages (e.g., TSI message 100).

At step 168, CM 16 receives one or more DHCPOFFER messages from CMTS 12 via cable network 14 on a downstream connection. At step 170, CM 16 selects an offer for IP 68 service and establishes a virtual IP 68 connection. The selected DHCPOFFER message contains a network host interface address (e.g., IP 68 address) in DHCP 80 yiaddr-field 138. Since CM 16 receives multiple DHCPOFFER messages (Step 168 FIG. 6) CM 16 resolves and acknowledges one offer.

Figure 7B:
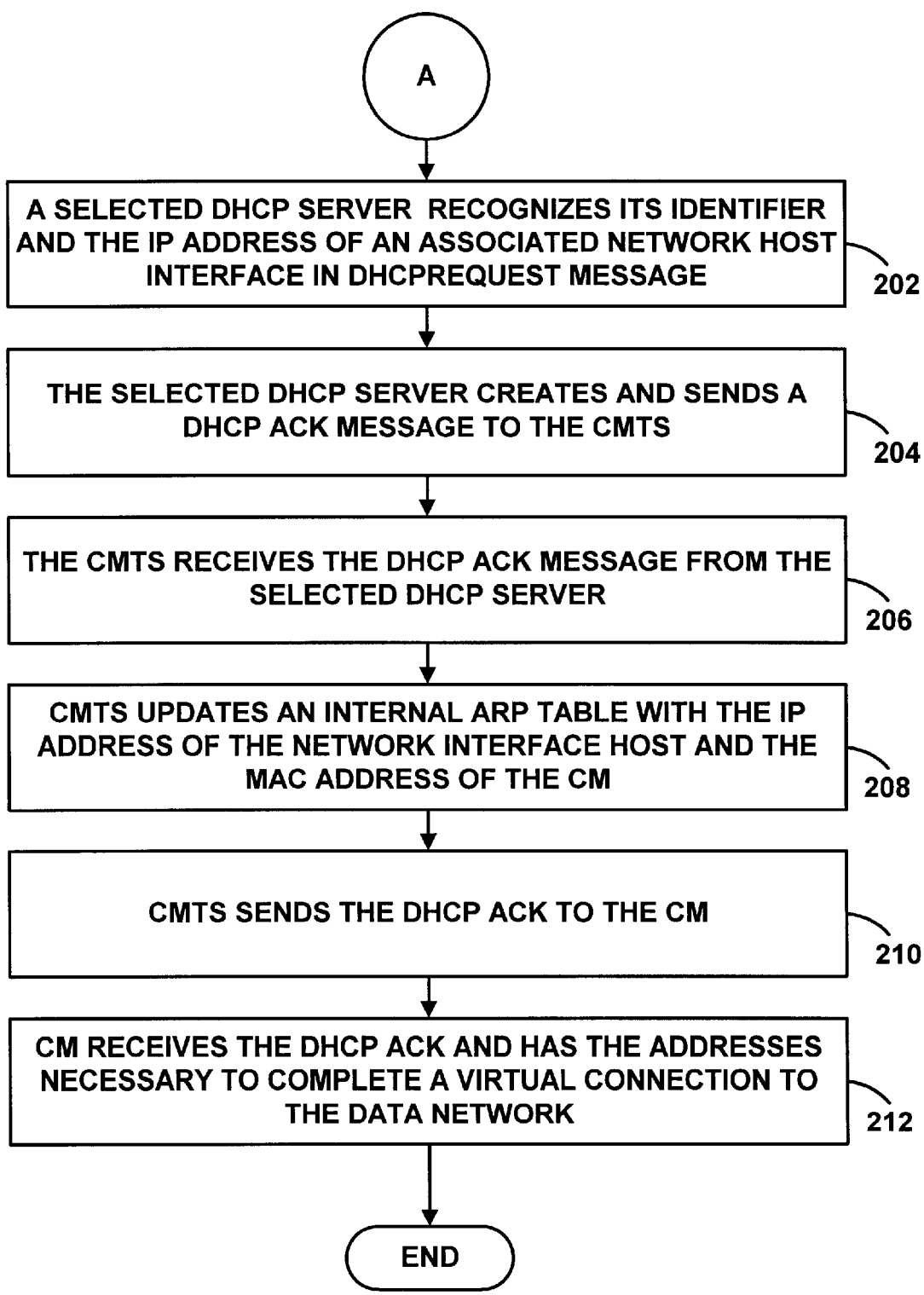

FIGS. 7A and 7B are a flow diagram illustrating a method 188 for resolving discovered host addresses in data-over-cable system 10. At step 190 in FIG. 7A, CM 16 receives one or more DHCPOFFER messages from one or more DHCP 80 servers 38 associated with one or more network host interfaces 42. The one or more DHCPOFFER messages include DHCP 80 fields set as illustrated in Table 4 above. At step 192, CM 16 selects one of the DHCPOFFER messages. At step 194 in FIG. 7A, CM 16 creates a DHCP 80 request message ("DHCPREQUEST") message to request the services offered by a network host interface selected at step 192. In one implementation the fields of the DHCPREQUEST message are set as illustrated in Table 5.

TABLE 5

| DHCP 80 Parameter | Description |
| --- | --- |
| OP 122 | Set to BOOTREQUEST. |
| HTYPE 124 | Set to network type (e.g., one for 10Mbps Ethernet). |
| HLEN 126 | Set to network length (e.g., six for 10Mbps Ethernet) |
| HOPS 128 | Set to zero. |
| FLAGS 130 | Set BROADCAST bit to zero. |
| CIADDR 136 | If CM 16 has previously been assigned an IP address, the IP address is placed in this field. If CM 16 has previously been assigned an IP address by DHCP 80, and also has been assigned an address via IPCP, CM 16 places the DHCP 80 IP 68 address in this field. |

TABLE 5-continued

| DHCP 80 Parameter | Description |
| --- | --- |
| YIADDR 138 | IP 68 address sent from the selected network interface host in DCHPOFFER message |
| GIADDR 142 | CM 16 places the Downstream Channel IP 68 address 80 CMTS 12 obtained in TSI message 76 on a cable downstream channel in this field. |
| CHADDR 144 | CM 16 places its 48-bit MAC 58 LAN address in this field. |
| SNAME 146 | DHCP 80 server identifier for the selected network interface host |

The DHCPREQUEST is sent upstream at step 196. The DHCPREQUEST message is used to "request" services from the CMTS 12 using the selected host address. The selected DHCP server 38 recognizes its address at step 202. The DHCP server creates and sends a DCHP 80 acknowledgment message ("DHCPACK") to CMTS 12 at step 204. At step 206, CMTS 12 receives the DHCPACK message from the selected DHCP 80 server associated with the selected network host interface IP 68 address (e.g., IP 68 interface). The siaddr-field 140 of the DHCPACK message contains an IP 68 address for a configuration file to be down loaded by CM 16 for registering with CMTS 12. CMTS 12 examines DHCP 80 yiaddr-field 138 and DHCP 80 chaddr-field 144 in the DHCPACK messages.

CMTS 12 updates an Address Resolution Protocol ("ARP") table and other routing tables on CMTS 12 to reflect the addresses in DHCP 80 yiaddr-field 138 and DHCP 80 chaddr-field 144 at step 208. As is known in the art, ARP allows a gateway such as CMTS 12 to forward any datagrams from a data network such as data network 32 it receives for hosts such as CM 16. ARP is defined in RFC-826, incorporated herein by reference.

Now, CMTS 12 has a valid IP/MAC address pair in one or more address routing tables to forward IP 68 data-packets from data network 32 to CM 16, thereby creating a virtual IP 68 data path to/from CM 16. CM 16 has necessary parameters to proceed to the next phase of initialization, a download of a configuration file via TFTP 78.

Method 188 can also be used with a cable modem that has a two-way connection (i.e., upstream and downstream) to cable network 14 and CMTS 12. In a data-over-cable-system, CM 16 would broadcast the DHCPREQUEST message to one or more DHCP 80 servers associated with one or more network host interfaces available on CMTS 12 using an upstream connection on data network 14. Method 188 accomplishes resolving addresses for network interface hosts from a cable modem in a data-over-cable with or without telephony return, and without extensions to the existing DHCP protocol.

Similarly, CPE 18 also uses DHCP 80 to generate requests to obtain IP 68 addresses to allow CPE 18 to also receive data from data network 28 via CM 16. In a preferred embodiment of the present invention, CM 16 functions as a standard BOOTP relay agent to facilitate access of CPE 18 to a DHCP server 38.

Briefly, CM 16 forwards a request from CPE 18 for a second network-host-interface IP 68 address from a DHCP server 38 using the procedure described above for the initialization of a CM 16. CM 16, however, places its own address in the giaddr-field in the forwarded DHCPDISCOVER message. If successful, CMTS 12 assigns another SID to this request, and hence to CPE 18. CMTS 12 updates its ARP table to reflect that data-packets from the second network-host-interface IP 68 address, allocated by DHCP server 38, are also to be sent to the MAC 58 address of CM 16. CM 16 maintains another ARP table that identifies the IP 68 address for the CPE 18 as being associated with the second network-host-interface IP 68 address. Note that in this implementation the ARP table maintained by CM 16 uses the same network-host-interface IP 68 address as used by CMTS 12 in its ARP table, but the associations are different. CMTS 12 routes all data-packets addressed to CM16 or CPE 18 to CM 16. Thus, now CM 16 can correctly forward the traffic addressed to CPE 18. Other embodiments are possible that may vary the address resolution strategy outlined here. This strategy is preferred because it keeps much of the process transparent. Thus, DHCP server 38 and CMTS 12 do not need to keep track of the CPE 18 that may be set up. In addition, CPE 18 may be a virtual CPE. This is possible if, for instance, two applications are running on the same machine with rather different, or at least independent, data-over-cable system resource requirements. Each of the applications requests their own network-host-interface IP 68 addresses. Only CM 16 has to keep track of their identity though the machine may need to resolve addresses as well. Upon completion of one task, the data-over-cable system resources are released without affecting the other application.

Quality-of-service in a Data-over-cable System

During initialization, an individual cable modem requests upstream and downstream connections with different Quality-of-Service ("QoS") to/from CMTS 12 on cable network 14. QoS collectively specifies the performance of the network service that a device expects on a network. The QoS connections are requested with a registration message sent from CM 16 to CMTS 12. The registration message includes a configuration file. The configuration file is requested by CM 16 from TFTP 78 using an address supplied by the DHCP server 38 as part of the DHCPACK message. The configuration file address supplied by the DHCP server 38 is for the default file. TFTP provides a file tailored to the particular device by using additional information. TFTP 78 maintains a table that permits it to access or construct a configuration file tailored to the specific device (e.g. the particular CM 16 model) requesting it. Furthermore, the CM 16 may modify some of the entries in the received configuration file before sending it upstream to CMTS 12 as part of the registration request. The configuration file contains parameters describing data-over-cable system resources needed by the requesting device. Exemplary configuration parameters, encoded in a TLV format, are shown in Table 6.

TABLE 6

| Type | Length | Description of Value |
| --- | --- | --- |
| 1 | 4 | Receive frequency |
| 2 | 1 | Upstream channel identifier |
| $4_x$ | N | Class of service header |
| $4_1$ | 1 | Class identifier |
| $4_2$ | 4 | Maximum downstream data in bits/sec |
| $4_3$ | 4 | Maximum upstream data rate in bits/sec |
| $4_4$ | 1 | Upstream channel priority |
| $4_5$ | 4 | Upstream guaranteed minimum data rate in bits/sec |
| $4_6$ | 2 | Maximum upstream configuration setting in mini-slots |
| $4_7$ | 1 | Privacy enable |
| 8 | 3 | Vendor Identifier configuration setting |
| $17_x$ | N | Baseline privacy settings header |
| $17_1$ | 4 | Authorize timeout seconds |
| $17_2$ | 4 | Reauthorize wait timeout seconds |
| $17_3$ | 4 | Authorization wait timeout seconds |
| $17_4$ | 4 | Operational wait timeout seconds |
| $17_5$ | 4 | Re-key wait timeout seconds |
| $17_6$ | 4 | TEK grace time seconds |
| 9 | N | Software upgrade filename |
| 10 | 1 | SNMP 62 access control |
| 11 | N | Arbitrary SNMP 62 object setting |
| 0 | N | Padding to align on 4-byte boundary |
| 3 | 1 | Network access |
| 6 | 16 | CM-MIC |
| 7 | 16 | CMTS-MIC |
| 255 | N/A | End-of-file |

CM 12 can change the configuration parameters prior to transmission to the CMTS 12. This situation also arises when CPE 18 has specific needs. This procedure avoids adding to the complexity of either the TFTP 68 or the DHCP servers 38. In a preferred embodiment CM 16 may only add to the configuration file parameters, but delete any information.

Resource ReSerVation Protocol ("RSVP") is also used to reserve bandwidth for quality-of-service and class-of-service connections. RSVP allows network layer quality-of-service and class-of-service parameters to be set. With extensions to RSVP quality-of-service and class-of-service parameters can also be changed in a data-link layer. RSVP allows data-link layer integrated and differential services to be used. For more information see RFC-2205 incorporated herein by reference.

In order to avoid increasing the computational load on the CMTS, often a QoS server 36 (FIG. 1) is delegated the task of tracking and allocating system resources. QoS server 36 determines whether CMTS 12 has available enough bandwidth to provide a specific QoS request to a CM 16. QoS server 36 maintains multiple quality-of-service identifiers allocated from a database 44 for QoS designations.

CM 16 adds a Service IDentifier ("SID") to the registration request message sent to CMTS 12. A SID identifies a device or a task. In particular, it identifies a bandwidth. A SID defines a particular mapping between CM 12 and CMTS 16. Within MAC 58, a SID is unique and CMTS 12 may assign one or more SIDs to each CM 16, corresponding to the QoS requested by CM 16. The SID assigned by CMTS 12 may not be the same as that supplied by the CM in the registration request. Preferably, there is one SID for each task. Table 7 provides an example of SID parameters in TLV format.

TABLE 7

| Type/Subtype | Length | Description of Value | Default Value |
| --- | --- | --- | --- |
| $B_x$ | N | Service Identifier Header | |
| $B_0$ | 1 | Service Identifier Type | 0 |
| $B_1$ | 1 | Number of Service Identifier's (SIDs) to be given with this definition | 1 |
| $B_2$ | 4 | Flow Identifier for SIDs | 0 |
| $B_3$ | 4 | CoS for SIDs | 0 |
| $B_4$ | 4 | Source IP 68 address | CM's IP 68 address |
| $B_5$ | 4 | Source IP 68 address mask | 255.255.255.255 |
| $B_6$ | 4 | Destination IP 68 address | 255.255.255.255 |
| $B_7$ | 4 | Destination IP 68 address mask | 255.255.255.255 |
| $B_8$ | 1 | IP Protocol Type | 256 |

TABLE 7-continued

| Type/Subtype | Length | Description of Value | Default Value |
|---|---|---|---|
| $B_9$ | 4 | Source Port (Start) | 0 |
| $B_{10}$ | 4 | Source Port (End) | 65,535 |
| $B_{11}$ | 4 | Destination Port (Start) | 0 |
| $B_{12}$ | 4 | Destination Port (End) | 65,535 |
| $B_{13}$ | 1 | Precedence and TOS | 0 |
| $B_{14}$ | 1 | Precedence and TOS Mask | 255 |
| $B_{15}$ | N | Multicast group definition | Null string "" |
| $B_{16}$ | 4 | Protocol Type | 0xffffffff |
| $B_{17}$–$B_{127}$ | N | Reserved | |
| $B_{128}$–$B_{255}$ | N | Vendor Specific | |

Bundling and Controlling Data Flow in a Data-over-cable System

As seen in the Table 7, a flow-identifier (also known as a group-identifier or a channel identifier) may be specified as part of a QoS request. Table 8 shows exemplary flow identifiers in TLV format.

TABLE 8

| Type/Subtype | Length | Description of Value |
|---|---|---|
| $A_x$ | N | Flow Class Definition Header |
| $A_0$ | 4 | Flow Class Identifier |
| $A_1$ | 1 | Flow Type TCP-IP |
| $A_2$ | 1 | Ethernet precedence and TOS |
| $A_3$ | 1 | ATM flow subtype -UBR |
| $A_4$ | 6 | Minimum number of bytes/sec |
| $A_5$ | 6 | Maximum number of bytes/sec |
| $A_6$ | N | Cell Error Ratio |
| $A_7$ | N | Cell Loss Ratio |
| $A_8$ | N | Cell Mis-insertion Rate |
| $A_9$ | N | Mean Cell Transfer Delay |
| $A_{10}$ | N | Cell Variation Delay |
| $A_{11}$–$A_{127}$ | N | Reserved |
| $A_{128}$–$A_{255}$ | N | Vendor Specific |

In addition, treatment accorded to the packets from a particular SID is determined by Flow Identifier (e.g. $A_0$ in Table 8) values shown in Table 9. The channel over which a data-packet is to be sent may be specified, as shown in Table 9.

TABLE 9

| Flow Identifier Value (4-bytes) | Definition of Value |
|---|---|
| 0 | The packet is to be sent to the network without any special treatment. |
| 1 | The packet is to be sent to the network using a precedence (i.e., priority) and TOS. |
| 2 to 255 | Reserved. |

The manner of transmission is specified as a Flow type (e.g. $A_1$ in Table 8), which are shown in Table 10.

TABLE 10

| Flow type | Definition |
|---|---|
| 1 | IP 68 |
| 2 | ATM |
| 3 | Data-link layer integrated services |
| 14 | Data-link layer differential services |
| 5 . . . 255 | Reserved |

As is seen in the Tables 9 and 10, there is considerable scope for individual providers to define channels for sending data from a data-over-cable system. The data-identification parameter used in this application refers to the particular Flow Identifier (also known as a Group Identifier) assigned to a Service Identifier. The term channel-identification parameter refers to the Flow Identifier as labeling particular channels.

Channel-identification and data-identification parameters arise in different contexts. Data-identification parameter is encountered when data-packets, originating from a Service Identifier, are received and have their corresponding Flow Identifier determined as the data-identification parameter. Once determined, it is then used to decide on a channel by determining channel-identification parameters. The two parameters, the data-identification parameter and the channel-identification parameter, are related but not necessarily identical. Any relationship between a data-identification parameter and a channel-identification parameter, including identity, is acceptable provided a specific channel can be identified for a given data-identification parameter. Furthermore, assignment of only one Flow Identifier to a Service Identifier is not a condition imposed by the invention, but an implementation detail of a preferred embodiment.

If the CMTS 12 is asked to send data on a channel that is not yet established, it may attempt to establish the channel. In order to establish a requested channel, CMTS 12 may initiate a protocol to carry out the necessary steps such as dialing a phone number for a telephony channel and the like.

In other embodiments TRAC 26 may be designed to provide similar control over outgoing traffic. However, in a preferred embodiment there is no control over data sent via TRAC 26 to other devices unless the path includes the CMTS. However, given the quick development of two-way data-over-cable systems, TRAC 26 may soon be obsolete.

The QoS server 36 can also help allocate tasks between multiple CMTSs 12 at the head-end. For example, if CM 16 makes a connection request with a requested quality-of-service for a first CMTS, and the first CMTS does not have the available bandwidth, QoS server 36 may direct a second CMTS with available bandwidth to respond to the connection request from CM 16. Or the first CMTS may refuse the requested service and direct the CM 16 to reinitialize and seek another upstream or downstream slot served by another CMTS.

In addition, the QoS server 36 may consider not just the downstream bandwidth available on the CMTS 12 to communicate with the CM 12 or CPE 18, but also the bandwidth available on the channels on which data are forwarded by the CMTS 12. It is possible to accommodate an application at a data rate less than that optimally desired by permitting caching of data received in excess of that expected by the allocated bandwidth. Caching refers to storage of the data in a high-speed memory. Caching is desirable when an application sends data at a high rate while the downstream connection between the CMTS 12 and the CM 16 has been allocated a smaller but acceptable bandwidth. Rather than refuse service or lose the excess data, the cached data may be forwarded later in agreement with the QoS negotiated. Similar caching strategies can be used for sending data from a data-over-cable system via a channel. This results in efficient utilization of the channel.

Data destined for a particular channel may be repackaged or "bundled" for more efficient transmission. Such bundling may combine data-packets from several different SIDs for further transmission and add bits for facilitating unbundling at the other end. In a preferred embodiment, the SID allows determination of the associated Flow-ID (or Group-ID) because there is only one Flow-ID associated with a SID. A simple example of bundling the flow of data from different SIDs is the transmission with multiplexing of data bits from several sources, over a T1 connection. As is known in the art, a T1 connection has 24 channels multiplexed in the time domain and transmitted at a data rate of 1.054 Mbps.

Depending on the data-identification parameter associated with a data-packet, though not necessarily included within the data-packet, a path or channel for the data-packet is specified along with protocols for establishing such a channel if it is not established and deciding if the requested service can be provided. In addition, data-packets from several different SIDs can be combined if they are destined for the same channel. These uses of the data-identification parameter and the corresponding channel-identification parameters result in efficient utilization of data-over-cable system resources.

Bundling of Data in a Data-over-cable System

FIG. 8 is a flow diagram illustrating a method 300 for transmitting data on a specific channel. At step 310 in FIG. 8 a first network device receives a request from a second network device for a connection to a third network device. The request includes a QoS specification and a choice of a channel over which the connection is desired. The choice of a channel is in the form of a channel-identification parameter. Thus, the first network device may consider the availability of the requested channel as part of the requested QoS, as is illustrated in step 312. If the request cannot be honored, the first network device sends a rejection to the second network device denying the requested service at step 314. However, if the requested service can be provided, at step 316 the first network device assigns a QoS identifier to a SID of the second network device, and also assigns a channel-identification parameter to the SID of the second network device. The term 'second network device' is used to include designation of a particular application running on a device, considered together. The QoS identifier labels a particular combination of various guarantees made to the second network device. Thus, a certain maximum error rate, a particular Class of Service and other parameters are mapped into the QoS identifier. The channel-identification parameter identifies the channel via which the service is requested. In principle, the specification of the channel could include a default option as well.

At step 318 the first network device updates look-up tables to record the association or correspondence between the SID of the second network device and the assigned channel-identification parameter and the QoS identifier. It is possible to have the channel identification parameter included within the QoS specification but they are illustrated as being separate specifications herein. At step 320, the first network device receives the data-packets from the second network device and determines the channel-identification parameter corresponding to the SID, of the second network device, included in the data-packet. A SID of the sending device is included within the data-packet to facilitate subsequent processing. The first network device, at step 322, sends the data-packets to the third network device over the requested channel.

FIG. 9 is a flow diagram illustrating a method 324 used in a preferred embodiment. At step 326, CMTS 12 receives a request from a CM 16 for a connection between the CM 16 and another device, possibly outside data-over-cable system 10. The request includes a SID being used by CM 16. A specific channel may be requested by a channel-identification parameter. This parameter need not be a number, and can be a TLV encoded specification for a particular type of connection as is illustrated in Table 9. A decision on whether the requested service can be provided is made at step 328. At step 330, a rejection is sent to CM 16. If the requested service cannot be provided, at step 332 CMTS 12 assigns a specific QoS identifier and a channel-identification parameter to the SID used by CM16. At step 334, CMTS 12 updates relevant tables to implement the bindings or correspondence defined between the SID and the QoS identifier and the channel-identification parameter.

Now CMTS 12 can receive and forward data from CM 16. At step 336 CMTS 12 receives data-packets from CM 16. CMTS 12 determines the channel on which the data-packets are to be forwarded from the SID of the sending CM 16. At step 338 CMTS 12 forwards the data-packets on the requested channel as requested by CM 16.

When CM 16 disconnects from CMTS 12, CMTS 12 sends a release message to QoS server 36 including the quality-of-service identifier for the connections released. QoS server 36 deletes the quality-of-service identifier from the list of allocated quality-of-service identifiers and adds the corresponding bandwidths associated with the quality-of-service identifier back into the available bandwidth pool for CMTS 12. The disconnection of a CPE 18 or the termination of an application is handled in a similar manner. Upon disconnecting, the channel reserved by the CM 16 or CPE 18 is also released. These changes may be tracked in database 44.

A preferred embodiment offers the advantages of more efficient use of data-over-cable system resources, release of resources when an application is terminated, and helps guarantee the availability of adequate resources to an application while the application is accessing data-over-cable system resources.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein. Additionally, the claims should not be read as limited to the described order or elements unless stated to that effect. Therefore, all embodiments that come within the scope and spirit of the following claims and equivalents thereto are claimed as the invention.

We claim:

1. A method for bundling data in a data-over-cable system having a plurality of network devices, the data-over-cable system having a plurality of channels, where at least one channel connects the data-over-cable system to a network outside of the data-over-cable system, the method comprising the steps of:

defining a data-identification parameter associated with a data-packet;

receiving one or more data-packets with an associated data-identification parameter on a first network device from a plurality of second network devices, said first network device having a plurality of channels where at least one of said channels is labeled by a channel-identification parameter;

determining a first channel on said first network device labeled by a first-channel-value with a channel-identification parameter corresponding to said data-identification parameter of said data-packet; and transmitting said data-packets on said first channel from the first network device to a network outside of the data-over-cable system.

2. The method of claim 1, wherein the first network device is a cable-modem-termination system and the second network device is a cable modem.

3. The method of claim 1, wherein a first channel is established by the data-over-cable system following a request by the second network device.

4. The method of claim 1, wherein substantially all data-packets from a port on said second network device are pre-assigned a particular data-identification parameter.

5. The method of claim 4, wherein the second network device requests said first-value of said data-identification parameter assigned to the port.

6. The method of claim 1, wherein said data-over-cable system allocates a bandwidth in said first channel of the first network device to a second network device.

7. The method of claim 1, wherein said first channel of the first network device is a virtual channel.

8. The method of claim 1, wherein the data-over-cable system provides quality-of-service by reserving bandwidth for use by the second network device on a channel on the first network device.

9. The method of claim 1, wherein said first channel connects the first network device to a plurality of networks outside the data-over-cable system.

10. The method of claim 1 further comprising:
establishing said first channel by negotiating a protocol with a network device at the other end of the channel.

11. A computer readable media having stored therein instructions to cause a central processing unit to execute the steps of the method of claim 1.

12. A method for bundling data in a data-over-cable system, said data-over-cable system having at least one cable-modem-termination system with a plurality of channels, and at least one of said channels having a channel-identification parameter, the method comprising:
receiving data-packets on the cable-modem-termination system in said data-over-cable system from a plurality of cable modems, said data-packets labeled by a data-identification parameter;
sorting said data-packets according to the data-identification parameter to generate sorted data-packets; and
transmitting said sorted data-packets on one of said channels to a network outside of the data-over-cable system, wherein the channel-identification parameter of said channel corresponds to the data-identification parameter of said sorted data-packets.

13. The method of claim 12, wherein substantially all of said data are transmitted upstream on a port for said cable modem with a pre-assigned value of the data-identification parameter.

14. A computer readable media having stored therein instructions to cause a central processing unit to execute the steps of claim 12.

15. The method of claim 12, wherein a bandwidth in said cable-modem-termination system is allocated to said cable modem for a path connecting the cable modem to the cable-modem-termination system.

16. The method of claim 12, wherein said channels include virtual channels.

17. The method of claim 12, wherein said data-over-cable system provides quality-of-service to the cable-modem-termination system and the cable modems.

18. A data-over-cable system for bundling data, the system comprising:
a plurality of cable modems;
a cable-modem-termination system, where said plurality of cable modems transmit data to the cable-modem-termination system, said data having a plurality of data-packets with at least one of said data-packets corresponding to a data-identification parameter; and
a plurality of labeled channels;
where at least one of said labeled channels is labeled by a channel identification parameter, said channels are connected to the cable-modem-termination system and to at least one network outside the data-over-cable system,
where furthermore the cable-modem-termination system transmits said data-packet on one of said labeled channels for transmitting data, wherein said labeled channel has the channel identification parameter corresponding to the data-identification parameter of the data-packet.

19. The data-over-cable system of claim 18, wherein said labeled channels for transmitting data include virtual channels.

20. The data-over-cable system of claim 18, wherein said data-over-cable system provides quality-of-service.

21. The data-over-cable system of claim 18, wherein said cable-modem termination system establishes the channel corresponding to the data-identification parameter of the data-packet.

* * * * *